Sept. 25, 1962 H. E. HANDLEY 3,055,970
LEAD TEST BOX
Filed March 3, 1958
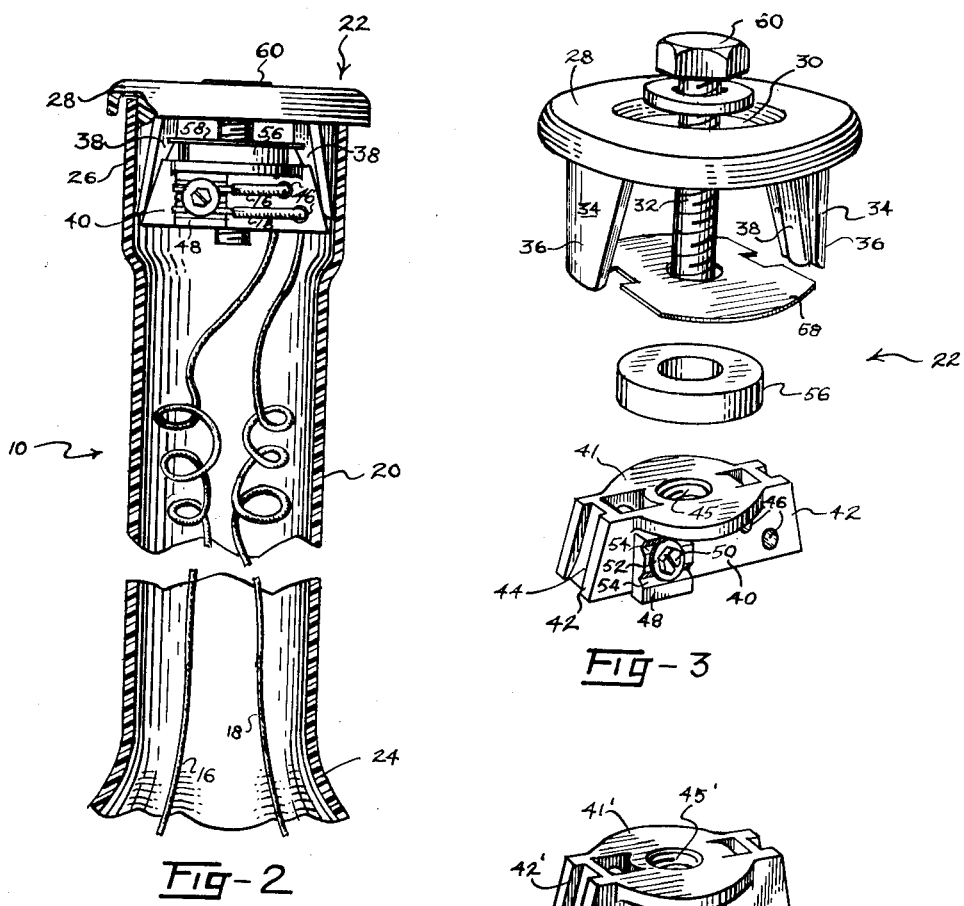
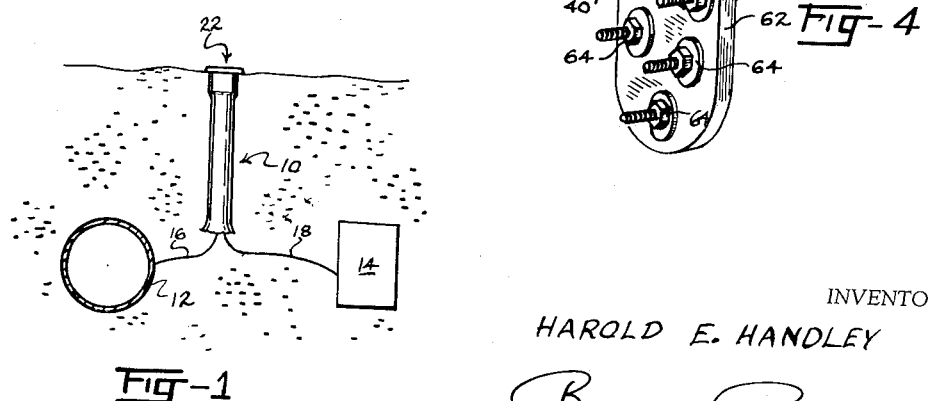
INVENTOR
HAROLD E. HANDLEY
BY Beaman & Beaman
ATTORNEY

United States Patent Office 3,055,970
Patented Sept. 25, 1962

3,055,970
LEAD TEST BOX
Harold E. Handley, Jackson, Mich., assignor, by mesne assignments, to Handley Industries, Inc., a corporation of Michigan
Filed Mar. 3, 1958, Ser. No. 719,185
8 Claims. (Cl. 174—37)

The invention relates to a terminal box and particularly pertains to an underground terminal box for testing of cathodic protection systems.

It has become common practice to utilize an impressed electrical current to prevent or reduce the rate of corrosion of a metal, usually an underground metal pipe line, storage tank or metallic cable sheath, due to electrolytic action of the soil by making the protected metal the cathode for the impressed current and using an expendable auxiliary anode. Such corrosion control is commonly designated "cathodic protection" and has found wide usage, especially in the public utility field. Basically, cathodic protection involves locating an expendable anode adjacent the pipe line, etc., and electrically interconnecting the anode and pipe line, which becomes the cathode. As most of the destructive corrosive action of a metal within an electrolytic environment takes place at the anodic areas the corroding is confined to the expendable anodes and the life of the cathode, e.g. pipe line, tank or cable, substantially increased. This type of anti-corrosion protection is well known and the apparatus involved takes several forms. For instance a "forced drainage" system may be used which employs a source of current such as a rectifier or generator to impress the desired charge to the pipe line and to the anode. "Galvanic anode drainage" is a self energizing system wherein the anode is an active metal such as zinc or magnesium and the current is produced by the galvanic potential between the metal to be protected and the anode.

When using the above methods of cathodic protection the pipe line, etc. and anode are connected together by an electrical conductor which is also buried under the surface of the ground and it is the purpose of the invention to provide access means to this conductor whereby the electrical potential of the cathode, e.g. pipe line, cable sheath, etc., and the anode may be periodically measured to determine the rate and degree of protection being obtained, future length of life of the anode and need for replacement or excavation of the anode. These factors may be determined by the use of electronic instruments connected to the electrical conductor interposed between anode and cathode.

It is thus an object of the invention to provide a terminal box which may be located underground and having access means flush with the ground surface which may be used as a test station for cathodic protection corrosion control.

Yet another object of the invention is to provide an underground terminal box of non-corrosive material, lightweight and capable of withstanding considerable shock and crushing forces.

A further object of the invention is to provide an underground terminal box having a removable cap flush with the ground installation to which electrical conductors may be affixed, and having means affixing the cap to the box whereby the possibility of caps corroding or becoming inoperative is minimized.

Another object of the invention is to provide an underground terminal box which resists rotation and also axial movement such as caused by frost heaving and incorporates locating means whereby either magnetic or electronic metal detectors may be used to locate the terminal box.

These and other objects of the invention will become apparent when viewed with reference to the accompanying description and drawings wherein:

FIG. 1 is a cross sectional elevational view of a typical installation of the terminal box of the invention, FIG. 2 is a partly sectioned elevational view of the invention assembled with cap and electrical conductors, FIG. 3 is an exploded perspective view of the components of the cap shown in FIG. 2, FIG. 4 is a perspective view of a modification of wedge member which may be used with the cap of FIGS. 2 and 3 for use with a plurality of conductors.

It will be appreciated that the terminal box of the invention, although illustrated and described as used in a cathodic protection system, is not limited to such usage and may be employed wherever an underground terminal box of this type is desired.

As illustrated in FIG. 1 the terminal box 10 may be used in conjunction with a pipe line 12, or other underground object such as a storage tank or a sheathed cable, and an anode 14 which is buried adjacent the object to be protected and usually at approximately the same depth. The system illustrated is of basic character and discloses the components of the galvanic anode drainage self energizing system wherein the anode is of an active metal such as zinc or magnesium and auxiliary current sources are not employed, however the terminal box 10 may be used with any cathodic protection system wherein it is desired to have access to the conductors interposed between the anode and cathode. In FIG. 1 the conductor consists of a pair of wires 16 and 18 connected to the pipe line 12 and anode 14, respectively, between which electrical continuity is established within box 10 as will be later described.

Referring to FIG. 2, the terminal box 10 consists of two basic components, a tube or housing 20 enclosed at the upper end by a cap 22. To minimize problems arising from corrosion and to prevent interference with the locating means housing 20 is entirely constructed of a relatively inert, non-corrosive, non-magnetic, insulating material such as a blend of the copolymers styrene-acrylonitrile resin and butadiene-acrylonitrile rubber, and the non-metallic parts of the cap 22 are constructed of the same or similar material. It will be understood that the construction of the box 10 is not limited to the above material, such material being cited only by way of illustration as having the desired characteristics which also include the faculty of being molded and machined with conventional equipment.

The housing 20 is of elongated tubular configuration being belled or flared at the lower end 24 and expanded to a uniform diameter at the upper end 26. The lower end 24 besides being outwardly flared is formed with a wavy or serpentine surface whereby the housing, when surrounded by earth, will effectively resist rotative forces as may result when moving or attaching the cap 22 and the flared end 24 will also prevent the housing 20 from moving in an axial direction such as being pulled out of the ground or movement due to frost heaving.

The components of cap 22 are best illustrated in FIG. 3 wherein it will be observed that the cap consists of a circular cover element 28 which is of greater diameter than the upper end 26 of housing 20 and is provided with a peripheral lip adapted to overlap the upper edge of the end 26 forming a seal. A central recess 30 is formed in cover 28 which is concentric to a hole, not shown, extending through the cover through which the bolt 32 projects. A pair of opposed expansion members 34 depend from the lower side of cover 28 and are formed on the outer surfaces 36 with a radius equal to the inner radius of the upper end 26 of the housing 20. The inner surfaces of expansion member 34 are formed with a raised key portion 38 having an inner inclined wedge surface for a purpose which will be later apparent.

A wedge element 40 having an integral shelf 41 cooperates with the inclined wedge surfaces of key 38 to expand members 34, and does so by means of a keyway 44 having inclined wedge surfaces complementary to those of key 38 formed in the ends 42 of the wedge element 40. The construction of keyway 44 and ends 42 also prevents relative rotation between members 34 and wedge 40 and maintains engagement and alignment of the inclined surfaces of each. A threaded hole 45 axially extends through wedge 40 for cooperation with bolt 32 whereby wedge 40 may be axially positioned relative to members 34. A pair of holes 46 are drilled through wedge element 40 for receiving the conductors 16 and 18 and a terminal 48 is affixed to wedge 40 by a threaded screw 50 and a washer 52 overlapping V grooves 54 cut into the terminal.

To aid in location of the terminal box, which being flush with the ground may easily become obscured by weeds, grass or dirt over a period of time, means are provided within cap 22 responsive to two different types of detecting means now in common usage. A ceramic magnet 56 in the form of a disk having a central opening is used to aid detectors of the dip needle type. The magnetic field produced by magnet 56 will cause a dip needle detector to register from a much greater distance than if a ferrous element were incorporated in the cap 22 or even if the entire box were constructed of steel or iron and locating the box of the invention is rapidly achieved.

An aluminum plate 58 is also incorporated in cap 22 in order to locate the terminal box by the use of electronic detectors operating on reflected signal principles. Plate 58 is of a shape to prevent interference with the moving elements of the cap and a central hole is also provided for bolt 32.

When assembled the cap 22 appears as in FIG. 2, the bolt 32 projecting through the aluminum plate 58, magnet 56 and screwing into the threaded hole 45 in the wedge element 40. The magnet 56 rests on shelf 41 and the plate 58 rests on the magnet. As the bolt is rotated by means of a wrench applied to head 60 the wedge element 40 is drawn toward the cover 28 thereby radially expanding members 34 outwardly under the influence of the forces produced by the inclined surfaces of key 38 and wedge 40. Thus when the cap 22 is inserted over the end 26 of the housing 20 the expansion members 34 may be expanded to frictionally engage the inner wall of the housing maintaining the cap in locked position. After assembly the first thread on the lower end of bolt 32 may be dimpled or crushed to prevent disengagement of the wedge 40 and bolt during normal operation of the cap expansion means.

To remove cap 22 from the housing the bolt 32 is rotated in the opposite direction permitting the wedge 40 to move away from cover 28 and the resilient character of expansion member 34 releases the frictional engagement with the inner wall of the end 26 whereby the cap may be lifted from the housing. Should the wedge 40 be so tightly engaging members 34 that unscrewing bolt 32 results in axial movement of the bolt rather than the wedge release of the wedge may be easily facilitated by merely tapping the bolt 32 downwardly.

The head 60 of bolt 32 will be located in the recess 30 and is of a pentagon configuration necessitating use of a special wrench or key for operation, thus making removal of cap 22 difficult with conventional tools. The ceramic magnet 56 is polarized such that the poles are located at the planar surfaces of the magnet disc and the lines of force will therefore be substantially in a vertical direction and the metallic components of the cap 22, other than plate 58, such as bolt 32, terminal 48 and screw 50, are preferably constructed of brass or similar metal which will not interfere with the magnetic field and is also corrosion resistant.

The conductor wires 16 and 18 are inserted up through the bottom of housing 20 and the ends of these wires are inserted through the holes 46 and the bare ends of the wires clamped in the grooves 54 of terminal 48 by the washer 52 and screw 50. Thus a continuous electrical circuit is maintained from the pipe line 12 to the anode 14 during normal operation of the system. When it is desired to test the cathode protection system the cap 22 is removed providing convenient access to wires 16 and 18 and the test equipment may be incorporated in the circuit between pipe line and the anode. Preferably, slack is provided in wires 16 and 18 within the housing 20 to permit the cap to be removed and tilted without straining the wires.

The embodiment of the invention illustrated in FIG. 4 is for use with a cathodic protection system wherein it is desired to use a single terminal box for testing several anodes or cathodic regions. The wedge member 40' is of the same design construction as wedge 40, like elements being primed, and functions in the same manner to bias the expandable member 34 outwardly, however, a terminal plate 62 of the same non-magnetic, non-conductive material of the terminal box 10 is affixed to the lower side of wedge 40' on which are mounted a plurality of terminal screws and associated nuts 64. A number of conductor wires may therefore be attached to the terminal screws 64 and several anodes checked at a single test station.

It will thus be appreciated that the invention provides a flush mounted underground terminal box which resists movement within the ground, may be readily located with conventional detecting apparatus, provides convenient access to buried wires and conductors, is lightweight, non-corrosive and is extremely durable. The light weight is of important significance due to low shipping costs and ease of handling. The expansion type cap is dependable in operation and will properly function even though the box is only opened annually.

Various modifications to the illustrated embodiment may be apparent to those skilled in the art without departing from the spirit and scope of the invention and it is intended that invention be defined only by the following claims.

I claim:

1. An underground terminal box of non-corrosive, non-magnetic, nonelectrical conducting material comprising a tubular cylindrical housing having upper and lower ends, a cap formed of the same material as said housing adapted to enclose said upper end, expansion elements depending from said cap adapted to engage the inner wall of said housing, operable means within said cap adapted to radially expand said expansion elements, a magnet within said cap, an electrical terminal affixed to said cap on the underside thereof, means adapted to affix electrical conductors to said terminal, the lower end of said housing being flared radially outwardly and formed of a noncircular diametrical section.

2. An underground terminal box of non-corrosive, non-magnetic, nonelectrical conducting material comprising a tubular housing having upper and lower ends, a cap of nonmagnetic, nonelectrical conducting material enclosing the upper end of said housing, expansion elements integrally formed on said cap adapted to engage the inner wall of said housing, wedge means adapted to actuate said expansion elements, a magnet supported within said cap, a non-magnetic electronic signal reflecting element in said cap and an electrical terminal affixed to said cap on the underside thereof for the connection of electrical conductors.

3. An underground terminal box as in claim 2 wherein the lower end of said housing is radially flared outwardly, said flared end having a surface of varying radii in the same diametrical plane.

4. An underground terminal box as in claim 2 wherein said expansion elements comprise diametrically opposed members having first inclined surfaces and said wedge means comprises a wedge having second inclined surfaces engaging said first surfaces and bolt means journaled in said cap threadedly engaging said wedge whereby rotation of said bolt produces relative axial movement between said first and second surfaces.

5. An underground terminal box as in claim 2 wherein a plurality of terminals are affixed to the underside of said cap.

6. An underground terminal box as used in conjunction with cathodic protection systems comprising, in combination, a tubular housing formed of noncorrosive, nonmagnetic, nonelectrical conducting material having open upper and lower ends, the lower end of said housing circumferentially flaring outwardly with respect to the general tubular configuration of the housing, said flared lower end having varying radii in the same diametrical plane alternately of greater and lesser length, a removable cap received within and selectively closing said upper housing end, a magnet associated with the upper end of said housing, and an electrical terminal mounted on the underside of said cap for encasement within said housing upon assembly of said housing and cap.

7. An underground terminal box as in claim 6 wherein said housing is formed of a blend of polymers of resin and rubber and said flared end is of a serpentine circumference diametrical section.

8. An underground terminal box as used in conjunction with cathodic protection systems comprising, in combination, a tubular housing formed of noncorrosive, nonmagnetic, nonelectrical conducting material having open upper and lower ends, the lower end of said housing circumferentially flaring outwardly with respect to the general tubular configuration of the housing, said flared lower end having varying radii in the same diametrical plane alternately of greater and lesser length, a removable cap received within and selectively closing said upper housing end, and an electrical terminal mounted on the underside of said cap for encasement within said housing upon assembly of said housing and cap.

References Cited in the file of this patent

UNITED STATES PATENTS

| | | |
|---|---|---|
| 910,192 | Grouvelle et al. | Jan. 19, 1909 |
| 916,354 | Mueller | Mar. 23, 1909 |
| 1,975,976 | Robinson | Oct. 9, 1934 |
| 2,076,650 | Kettron | Apr. 13, 1937 |
| 2,146,462 | Bone | Feb. 7, 1939 |
| 2,198,368 | Lavarack | Apr. 23, 1940 |
| 2,550,607 | Shoemaker | Apr. 24, 1951 |
| 2,787,397 | Radford | Apr. 2, 1957 |
| 2,831,596 | Eyles | Apr. 22, 1958 |

OTHER REFERENCES

"Modern Plastics Encyclopedia," 1954, page 299.